United States Patent

Tanaka et al.

(10) Patent No.: US 6,737,772 B2
(45) Date of Patent: May 18, 2004

(54) AC GENERATOR FOR USE IN VEHICLE AND METHOD FOR FORMING CONNECTION LATCH PORTION IN CONDUCTOR WIRE APPLIED TO STATOR WINDING THEREOF

(75) Inventors: Kazunori Tanaka, Tokyo (JP); Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/859,541

(22) Filed: May 17, 2001

(65) Prior Publication Data

US 2002/0043882 A1 Apr. 18, 2002

(30) Foreign Application Priority Data

Oct. 18, 2000 (JP) ........................................ 2000-318075

(51) Int. Cl.[7] .............................. H02K 9/06; H02K 5/22; H02K 3/50
(52) U.S. Cl. ........................................ 310/71; 439/884
(58) Field of Search ............................. 310/71; 439/884

(56) References Cited

U.S. PATENT DOCUMENTS

| 1,751,405 | A | * | 3/1930 | Herman ...................... 439/883 |
| 2,286,097 | A | * | 6/1942 | Johnson ........................ 29/863 |
| 4,769,906 | A | * | 9/1988 | Purpura et al. ................ 29/857 |
| 5,055,726 | A | * | 10/1991 | D'Entremont et al. ........ 310/71 |
| 5,124,603 | A | * | 6/1992 | Hayward et al. ......... 310/68 D |
| 5,331,231 | A | * | 7/1994 | Koplin et al. ............. 310/68 D |
| 5,349,131 | A | * | 9/1994 | Sotani et al. ................... 174/24 |
| 5,646,838 | A | * | 7/1997 | Keidar et al. ................ 363/145 |
| 5,682,070 | A | * | 10/1997 | Adachi et al. ................. 310/71 |
| 5,686,780 | A | * | 11/1997 | Adachi et al. ............ 310/68 D |
| 5,866,963 | A | * | 2/1999 | Weiner et al. ............ 310/68 D |
| 6,528,912 | B2 | * | 3/2003 | Asao ........................ 310/68 D |

FOREIGN PATENT DOCUMENTS

| JP | 53089908 | A | * | 8/1978 | ............ H02K/5/22 |
| JP | 55053147 | A | * | 4/1980 | ............ H02K/5/22 |
| JP | 4-168952 | | | 6/1992 | ............ H02K/9/06 |
| JP | 05103440 | A | * | 4/1993 | ............ H02K/5/22 |
| JP | 09163657 | A | * | 6/1997 | ............ H02K/3/46 |
| JP | 2000032720 | A | * | 1/2000 | ............ H02K/19/36 |
| JP | 2002136077 | A | * | 5/2002 | ............ H02K/19/36 |

* cited by examiner

Primary Examiner—Burton S. Mullins
Assistant Examiner—J. Aguirrechea
(74) Attorney, Agent, or Firm—Sughrue Mion, PLLC

(57) ABSTRACT

The present invention provides an AC generator for use in a vehicle, which eliminates the need for metallic terminals, and which reduces the number of components and the number of man-hours needed for a connecting operation to thereby reduce the cost thereof and enhance the reliability thereof. Each of conductor wires of a stator winding has a circular cross section and also has an end portion at which a connection latch portion to be connected to a mounting seat of a rectifier is formed. The connection latch portion is constituted by deforming an end portion of each of the conductor wires like a plate and subsequently forming a cutout in the end portion deformed like a plate.

6 Claims, 9 Drawing Sheets

AC GENERATOR FOR USE IN VEHICLE AND METHOD FOR FORMING CONNECTION LATCH PORTION IN CONDUCTOR WIRE APPLIED TO STATOR WINDING THEREOF

This application is based on Application No. 2000-318075, filed in Japan on Oct. 18, 2000, the contents of which are hereby incorporated by reference.

BACKGROUND OF THE INVENTION

1. Field of the Invention

The present invention generally relates to an AC generator for use in a vehicle. More particularly, the present invention relates to a structure for connecting lead wires and neutral leads of a stator winding to a rectifier and also relates to a method for forming such a structure.

2. Description of the Related Art

FIG. 13 is a longitudinal sectional view illustrating a conventional AC generator for use in a vehicle. FIG. 14 is a perspective view illustrating a stator structure applied to the conventional AC generator. FIG. 15 is a perspective view of a primary part thereof and illustrates the connection between a metallic terminal and a conductor wire serving as a stator winding of a stator, which is applied to the conventional AC generator for use in a vehicle. FIG. 16 is a perspective view illustrating a mounting structure for mounting the stator winding of the conventional AC generator on a rectifier.

As shown in FIG. 13, the AC generator for use in a vehicle comprises a case 3 consisting of an aluminum front bracket 1 and an aluminum rear bracket 2, a shaft 6 having an end portion to which a pulley 4 is fixed, a Lundell type rotor fixed to this shaft 6, fans 5 respectively fixed at both axial end portions of this rotor 7, a stator 8 fixed to the cased 3 in such a way as to surround the rotor 7, slip rings 9, fixed to the other end portion of the shaft 6, for supplying an electric current to the rotor 7, a pair of brushes 10 adapted to slide over the surface of the slip rings 9, a brush holder 11 for accommodating the pair of brushes 10, a rectifier 12, electrically connected to the stator 8, for rectifying an alternating current generated in the stator 8 into a DC current, and a regulator 18, fitted into the brush holder 11, for regulating an AC voltage generated in the stator 8.

The rotor 7 has a field coil 13 adapted to generate magnetic flux when an electric current is fed thereto, and a pair of pole cores 20 and 21 provided in such a manner as to cover this field coil 13, magnetic poles being formed in the poles 20 and 21 by the magnetic flux. Further, the pair of pole cores 20 and 21 has iron claw-shaped magnetic poles provided with equal angular pitches in the direction of the circumference of the an outer peripheral portion thereof in such a way as to protrude therefrom so that the maximum radial section thereof is nearly trapezoidal. Moreover, the pair of pole cores 20 and 21 is securely fixed to the shaft 6 so that the claw-shaped magnetic poles 22 and 23 are made to face and mesh with each other.

The stator 8 is constituted by a cylindrical stator core 16 formed by using laminated magnetic steel plates and a stator winding 17 wound around the stator core 16, as illustrated in FIG. 14. A plurality of slots 16a each extending in an axial direction are formed with a predetermined pitch in the circumferential direction in the stator core 16. The stator winding 17 is constituted by three winding units 26 each obtained by winding a copper conductor wire 25 having a circular cross section coated with electrical insulation for a predetermined number of turns into a wave-shaped pattern.

The three winding units 26 are wound around the stator core 16 in such a way as to be respectively accommodated in every three slots 16a by shifting each of the slots, in each of which the corresponding winding unit is accommodated, by one slot. The beginning end portions of the winding units 26 constitute lead wires 26a, 26b, and 26c, respectively. The finishing ends of the winding units 26 constitute neutral points 26n. Further, the stator winding 17 is constituted by bringing together the neutral points 26n of the three winding units 26, that is, establishing three phase alternating current connection (Y-connection) among the three winding units 26. Moreover, a metallic terminal 27 made of, for example, tough pitch copper is connected to each of the lead wires 26a, 26b, and 26c. Furthermore, one end portion of the neutral lead 28 and the three neutral points 26n are put together and integrated with one another by solder. Another metallic terminal 27 is connected to the other end portion of the neutral lead 28.

Incidentally, as shown in FIG. 15, the metallic terminal 27 is connected to the conductor wire 25 at a portion A by soldering or welding after the grasping piece 27a thereof is caulked and attached to the end portion, from which the insulating coating is removed, of the conductor wire 25. Additionally, the metallic terminal 27 is similarly connected to the other end portion of the neutral lead 28.

As illustrated in FIG. 16, the rectifier 12 comprises a plurality of positive-electrode-side diodes 30 and negative-electrode-side diodes 31 for performing full-wave rectification on three-phase alternating current, first and second cooling plates 32 and 33 for cooling the positive-electrode-side diodes 30 and the negative-electrode-side diodes 31, an insulator 34 for insulating the first and second cooling plates 32 and 33, a circuit board 35, and an output terminal 36.

The first cooling plate 32 is formed in a horseshoe shape. The positive-electrode-side diodes 30 are mounted on a principal surface 32a thereof in such a way as to be arranged in the direction of the circumference thereof Further, radiating fins 32b are erected on the rear surface (that is, the surface opposite to the principal surface) of the first cooling plate 32. Moreover, flange portions 32c radially and outwardly extend from both circumferentially end portions of and a central portion of the first cooling plate 32. Furthermore, a through hole (not shown) is dug in each of the flange portions 32c.

The second cooling plate 33 is formed in a horseshoe shape in such a way as to have a diameter, which is larger than that of the first cooling plate 32. The negative-electrode-side diodes 31 are mounted on a principal surface 33a of second cooling plate 33 in such a manner as to be arranged in the direction of the circumference thereof. Moreover, through holes (not shown) are dug in both circumferential end portions of and a central portion of the second cooling plate 33 correspondingly to the through holes dug in the first cooling plate 32.

The circuit board 35 is a resin molding in which wiring for constructing diode bridges of the positive-electrode-side diodes 30 and the negative-electrode-side diodes 31 are insert-molded. Further, the circuit board 35 is formed in a horseshoe shape, similarly as the second cooling plate 33. Moreover, through holes 35a are dug in both circumferentially end portions of and a central portion of the circuit board 35 correspondingly to the through holes dug in the first cooling plate 32. Furthermore, screw holes 37a, 37b, 37c, and 37n for electrically connecting the lead wires 26a, 26b, and 26c and the neutral leads 28 of the stator winding 17 to the rectifier 12 are provided therein. Additionally, each of mounting seats 39a, 39b, 39c, and 39n is provided on the outer peripheral portion around a corresponding one of the screw holes 37a, 37b, 37c, and 37n.

This rectifier 12 is assembled as follows. First, the first cooling plate 32 is placed so that the through hole dug in each of the flange portions 32c is aligned with a corresponding one of through holes dug in the second cooling plate 33. Moreover, the circuit board 35 is stacked on the cooling plate 32 so that each of the through holes 35a is aligned with a corresponding one of the through holes dug in the flange portions 32c. At that time, an insulator 34 is interposed between each of the flange portions 32c and the principal surface 33a of the second cooling plate 33. Thus, the electrical connection between each of the flange portions 32c and the principal surface 33a is prevented from being established. The first cooling plate 32 and the second cooling plate 33 are concentrically arranged so that the principal surfaces 32a and 33a are in the same plane position. The positive-electrode-side diodes 30 and the negative-electrode-side diodes 31 are disposed so that each of the diodes 30 faces a corresponding one of the diodes 31. Furthermore, a connecting terminal 35b extending from each of the mounting seats 39a, 39b, 39c, and 39n is put between each of the terminal 30a of the positive-electrode-side diodes 30 and a corresponding terminal 31a of the negative-electrode-side diodes 31 and connected thereto by solder. Subsequently, an output terminal 36 is passed through one of the through holes 35a formed in the circuit board 35 and the through holes dug in the first cooling plate 32 and the second cooling plate 33. Thus, the rectifier shown in FIG. 16 is assembled.

The rectifier 12 assembled in this manner is attached to the rear bracket 2 by passing mounting screws (not shown) through the remaining two through holes 35a and the through holes dug in the first cooling plate 32 and the second cooling plate 33 and screwed in screw holes (not shown) provided in the rear bracket 2.

Then, the lead wires 26a, 26b, and 26c and the neutral lead 28 of the stator winding 17 are electrically connected to the rectifier 12. Incidentally, as illustrated in FIG. 16, the metallic terminal 27 connected to the neutral lead 28 is put above the screw hole 37n. Then, a mounting screw 38 is passed through a hole 27b of the metallic terminal 27. Moreover, the screw 38 is screwed into the screw hole 37n. Thus, the metallic terminal 27 is electrically connected to the mounting seat 39n. Similarly, the metallic terminals 27 connected to the lead wires 26a, 26b, and 26c are electrically connected to the mounting seats 39a, 39b, and 39c by screwing the mounting screws 38 into the screw holes 37a, 37b, and 37c, respectively.

In the conventional AC generator for use in a vehicle, which is constructed as described above, electric current is supplied from a battery (not shown) to the field coil 13 through the brushes 10 and the slip rings 9. Thus, magnetic flux is generated therein. The claw-shaped magnetic poles 22 of the pole core 20 are magnetized into North-seeking (N) poles by the magnetic flux, while the claw-shaped magnetic poles 23 of the pole core 21 are magnetized into South-seeking (S) poles.

On the other hand, the pulley 4 is driven by an engine. The rotor 7 is rotated by the shaft 6. This rotation of the rotor 7 causes a rotating magnetic field in the stator core 16, so that an electromotive force is generated in the stator winding 17. Alternating current electromotive force generated in this stator 8 is rectified by the rectifier 12 to a DC current. Moreover, the magnitude of an output voltage thereof is adjusted by a regulator 18. Further, an output of the rectifier 12 is charged to the battery through the output terminal 36.

In the conventional AC generator for use in a vehicle, each of the lead wires 26a, 26b, and 26c and the neutral lead 28 thereof is connected to the metallic terminal 27. Thus, the conventional AC generator for use in a vehicle has drawbacks in that the number of components increases, that the number of man-hours needed for connecting the metallic terminals 27 increases, and that the cost thereof increases. In the case of this conventional generator, the number of slots per pole per phase is 1. When the number of slots per pole per phase increases, the number of the lead wires and the neutral leads also increases. This results in additional increase in the number of components and the number of man-hours needed for the connecting operation.

Furthermore, in the conventional generator, the connection between the stator winding 17 and the rectifier 12 is established by using the metallic terminals 27. Thus, the conventional generator has the following defects and a drawback in that the reliability thereof is degraded.

First, the strength of the connection from each of the lead wires 26a, 26b, and 26c, and the neutral lead 28 to the rectifier 12 depends upon that of the connection from each of the metallic terminal 27 to a corresponding one of the lead wires 26a, 26b, and 26c and the neutral lead 28.

Further, when the connection from each of the metallic terminal 27 to a corresponding one of the lead wires 26a, 26b, and 26c and the neutral lead 28 is established by using solder, problems of the heat resistance and life of the solder occur. That is, there is a fear that the thermal degradation of the connecting portion occurs and results in disconnection from the metallic terminal from the wires and the lead. Furthermore, when the solder is deteriorated, the connection resistance increases. This results in increase in the calorific value of heat generated in a portion whose connection resistance increases. Thus, the thermal degradation of the solder is accelerated. Furthermore, to solve such a problem, it has been considered that the heat resistance is increased by using lead solder. However, this causes an environmental problem. Moreover, an increase in the melting point results in degradation in the soldering workability thereof.

Further, when the metallic terminals 27 are welded to the lead wires 26a, 26b, and 26c, and the neutral lead 28, the melted and hardened portions of the conductor wires 25 are liable to crack. Moreover, when welded, oxides contained in the metallic terminals 27 and the conductor wires 25 are reduced, so that water vapor is generated. The generation of this water vapor causes intercrystalline cracks, so that blowholes are generated in the melted and hardened portions of the metallic terminals 27 and the conductor wires 25. This results in decrease in the connection strength and increase in the connection resistance. Consequently, there are fears that weld break occurs owing to the vibration of the generator, and that furthermore, a high temperature of the insulative coating 25a at the time of welding damages the coating 25a and results in corrosion of the conductor wires 25.

Additionally, in the case of connecting the conductor wires 25 to the metallic terminals 27 by caulking the grasping pieces 27a without soldering and welding, there are fears that the strength of the connection therebetween is unstable, and that the connection resistance increases. Besides, in the case that an excessive pressure is applied when the pieces 27a are caulked, the break of the metallic terminal 27 may occur.

SUMMARY OF THE INVENTION

In order to solve the above-mentioned problems, it is an object of the present invention to provide an AC generator for use in a vehicle, which eliminates the need for the metallic terminals by processing end portions of conductor wires and forming the connection latch portion for connecting each of the conductor wires to the rectifier, and which reduces the cost by decreasing the number of components and the number of man-hours needed for a connecting operation, and which enhances the reliability thereof.

Further, another object of the present invention is to provide a method for forming the connection latch portions, which are fastened to the mounting seats of the rectifier, with a low cost at the end portions of the conductor wires applied to the stator winding.

According to an aspect of the present invention, there is provided an AC generator (hereunder referred to as a first AC generator) for use in a vehicle, which has a stator having a stator core and a stator winding wound around the stator core, and a rectifier for rectifying an AC output of the stator. This AC generator further comprises a connection latch portion formed at an end portion of each of conductor wires constituting the stator winding in such a manner as to have a mounting hole. In this AC generator, the conductor wires are connected to the rectifier by passing mounting screws through the mounting holes to thereby fasten and fix the connection latch portions to mounting seats of the rectifier.

Further, in an embodiment (hereunder referred to as a second AC generator) of the first AC generator of the present invention, each of the connection latch portions is formed like a plate.

Further, in an embodiment (hereunder referred to as a third AC generator) of the second AC generator of the present invention, each of the connection latch portions is formed in such a manner as to have a thickness nearly equal to that of the conductor wires.

Further, in an embodiment (hereunder referred to as a fourth AC generator) of the first AC generator of the present invention, each of the connection latch portions is formed by folding back the end portion of each of the conductor wires deformed like thin plates.

Further, in an embodiment (hereunder referred to as a fifth AC generator) of the first AC generator of the present invention, each of the conductor wires has a rectangular cross section. Each of the connection latch portions is formed by digging the mounting hole in the end portion of each of the conductor wires.

Further, in an embodiment (hereunder referred to as a sixth AC generator) of the fifth AC generator of the present invention, each of the connection latch portions is formed like a plate whose thickness is less than that of the conductor wires.

Further, according to another aspect of the present invention, there is provided a method for forming connection latch portions of conductor wires applied to a stator winding of an AC generator for use in a vehicle, which comprises the steps of removing an insulating coating from a predetermined end-side range of each of the conductor wires each covered with the insulating coating, deforming an end portion of each of the conductor wires like a plate, and forming a mounting hole in the end portion, which is deformed like a plate, of each of the conductor wires.

Moreover, according to another aspect of the present invention, there is provided a method for forming connection latch portions of conductor wires applied to a stator winding of an AC generator for use in a vehicle, which comprises the steps of removing an insulating coating from a predetermined end-side range of each of the conductor wires each covered with the insulating coating, bending an end portion of each of the conductor wires like a ring, and deforming the end portion, which is bent like a ring, of each of the conductor wires like a plate and subsequently forming a mounting hole in the end portion of each of the conductor wires.

Furthermore, according to another aspect of the present invention, there is provided a method for forming connection latch portions of conductor wires applied to a stator winding of an AC generator for use in a vehicle, which comprises the steps of removing an insulating coating from a predetermined end-side range of each of the conductor wires each covered with the insulating coating, deforming an end portion of each of the conductor wires like a sphere by melting the end portion thereof, deforming the end portion, which is deformed like a sphere, of each of the conductor wires like a plate, and forming a mounting hole in the end portion of each of the conductor wires.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Hereinafter, the preferred embodiments of the present invention will be described in detail by referring to the accompanying drawings.

First Embodiment

Figure 1:
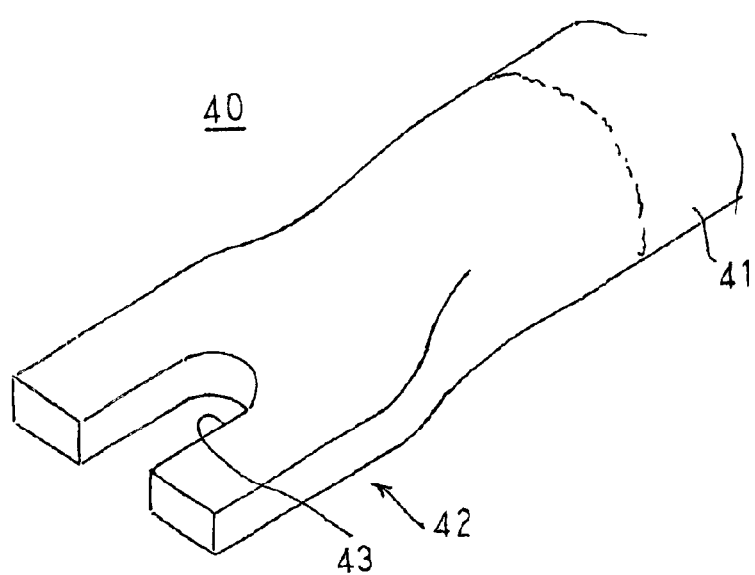
FIG. 1 is a perspective view illustrating a primary part of conductor wires applied to a stator winding of an AC generator, which is a first embodiment of the present invention, for use in a vehicle.
Figure 2:
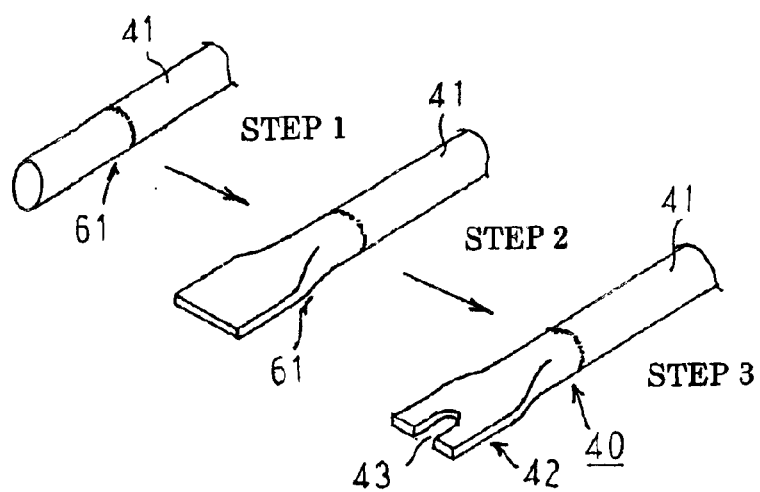
FIG. 2 is a view illustrating a method of manufacturing the connection latch portions of the conductor wires applied to the stator winding of the AC generator, which is the first embodiment of the present invention, for use in a vehicle.
Figure 3:
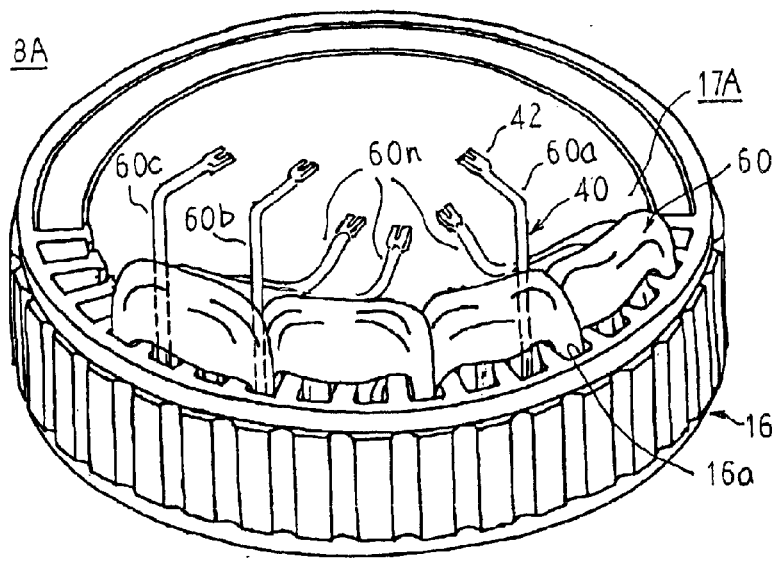
FIG. 3 is a perspective view illustrating a stator structure applied to the AC generator, which is the first embodiment of the present invention, for use in a vehicle.
Figure 4:
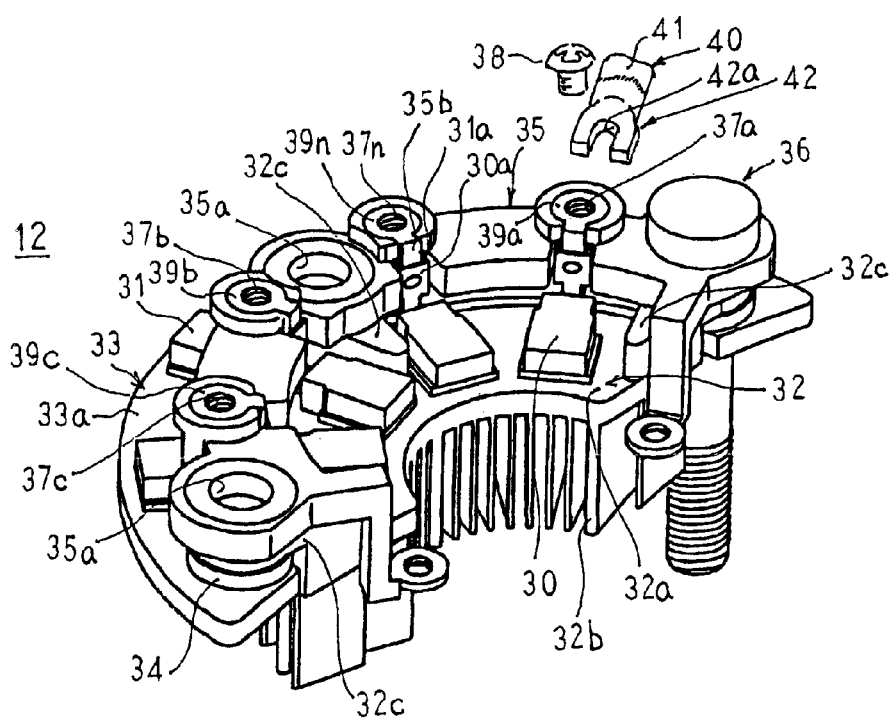
FIG. 4 is a perspective view illustrating a structure for attaching the stator winding to a rectifier of the AC generator, which is the first embodiment of the present invention, for use in a vehicle.

FIG. 1 is a perspective view illustrating a primary part of conductor wires applied to a stator winding of an AC generator, which is the first embodiment of the present invention, for use in a vehicle. FIG. 2 is a view illustrating a method of manufacturing the connection latch portions of the conductor wires applied to the stator winding of the AC generator, which is the first embodiment of the present invention, for use in a vehicle. FIG. 3 is a perspective view illustrating a stator structure applied to the AC generator, which is the first embodiment of the present invention, for use in a vehicle. FIG. 4 is a perspective view illustrating a structure for attaching the stator winding to a rectifier of the AC generator, which is the first embodiment of the present invention, for use in a vehicle.

As shown in FIG. 1, a conductor wire 40 applied to the stator winding is a copper wire that is covered with an insulating coating 41 and that has a circular cross section. A connection latch portion 42 is formed at each of both end portions of the conductor wire 40. Each connection latch portion 42 is formed by deforming the end portion of the conductor wire 40 like a thin plate, whose thickness is less than the diameter of the conductor wire 40, and forming a cutout 43 serving as a mounting hole, through which a mounting screw 38 is passed, in the deformed end portion of the conductor wire 40.

Next, a method of manufacturing the connection latch portion 42 is described hereinbelow with reference to FIG. 2.

First, the insulating coating 41 covering the both end portions of a conductor wire rod 61 constituted by a copper wire rod having a circular cross section is removed in step 1. Subsequently, press working is performed on each of the both end portions of the conductor wire rod 61. Then, each end portion of the conductor wire rod 40A is rolled out and deformed like a plate in step 2. Thereafter, press cutting is performed on each plate-like end portion, so that the cutout 43 is formed in step 3. Thus, a conductor wire 40 having the connection latch portion 42 at each of the both end portions thereof is obtained.

Next, a method for fabricating a stator using this conductor wire 40 is described hereinbelow with reference to FIG. 3.

First, three winding units 60 are formed by winding the conductor wire 40 having the connection latch portions 42 for a predetermined number of turns into a wave-shaped pattern, respectively. Then, three winding units 60 are wound around the stator core 16 in such a way as to be respectively accommodated in every three slots 16a by shifting each of the slots 16a, in each of which the corresponding winding unit is accommodated, by one slot. Consequently, a stator winding 17A composed of three winding units 60, for example, corresponding to a-phase, b-phase, and c-phase windings are wound around the stator core 16 to assemble a stator 8A.

Figure 13:
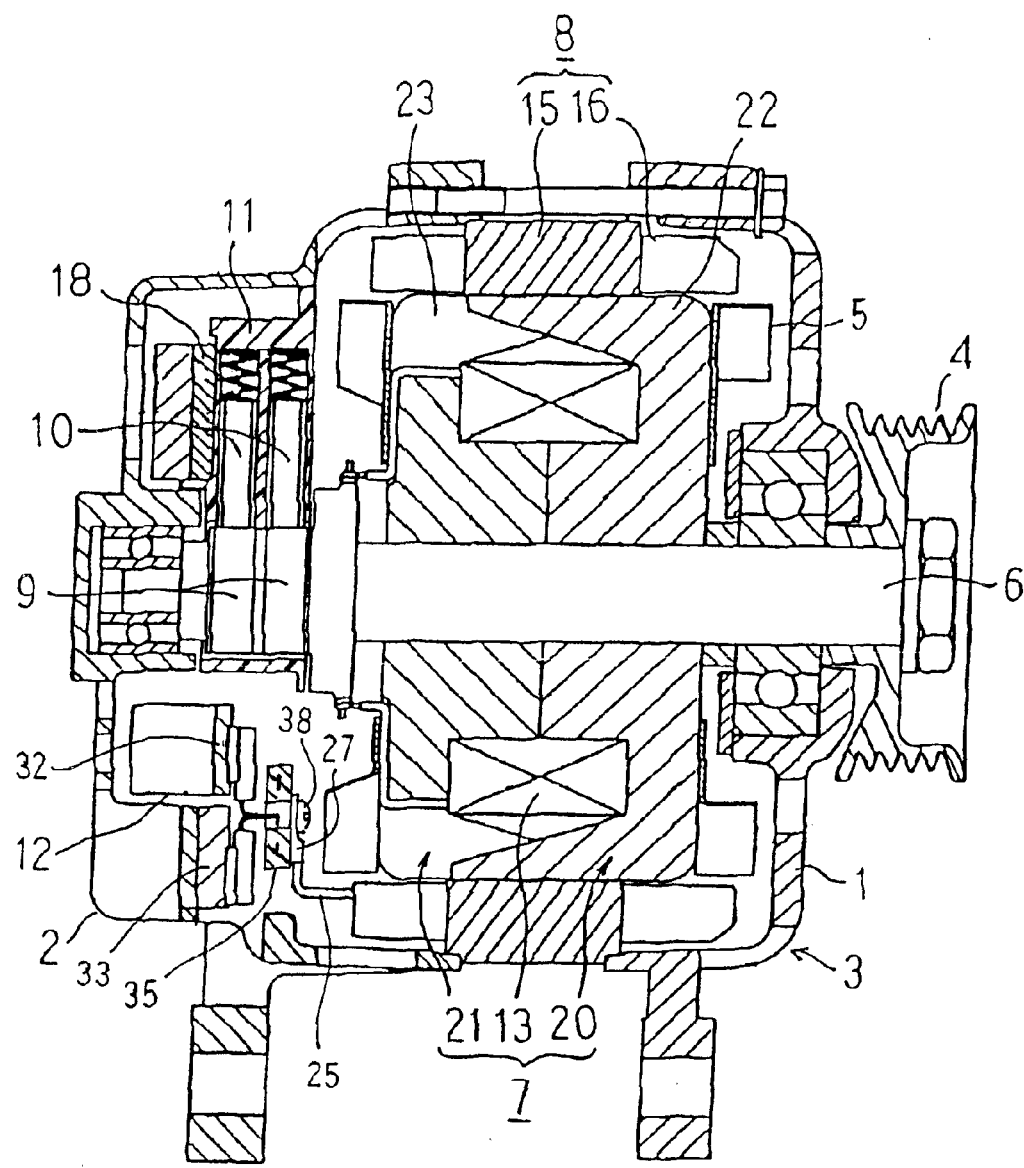
FIG. 13 is a longitudinal sectional view illustrating a conventional AC generator for use in a vehicle.
Figure 14:
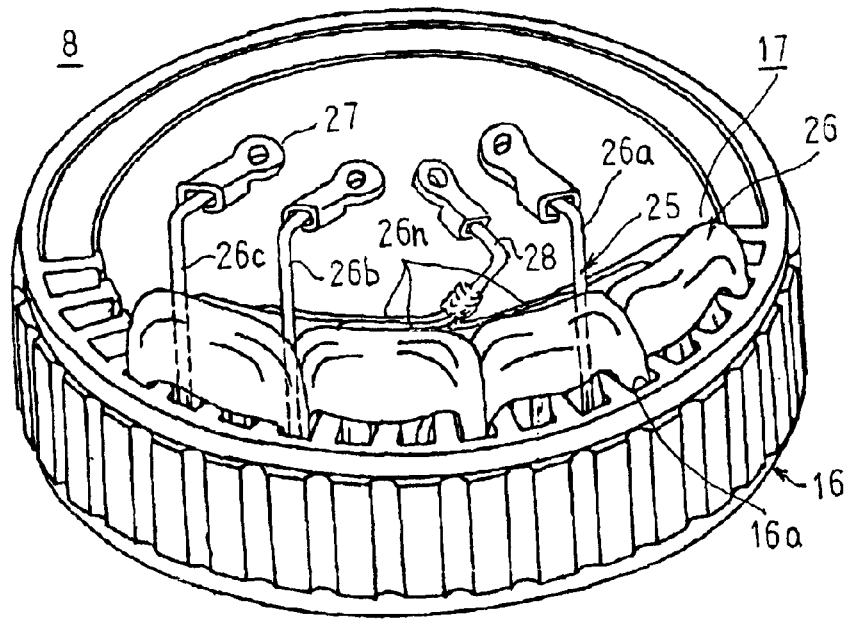
FIG. 14 is a perspective view illustrating a stator structure applied to the conventional AC generator for use in a vehicle.
Figure 15:
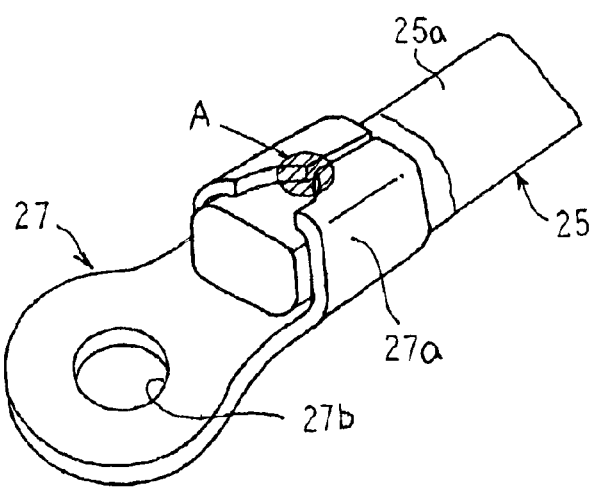
FIG. 15 is a perspective view of a primary part thereof and illustrates the connection between a metallic terminal and a conductor wire serving as a stator winding of a stator, which is applied to the conventional AC generator for use in a vehicle.
Figure 16:
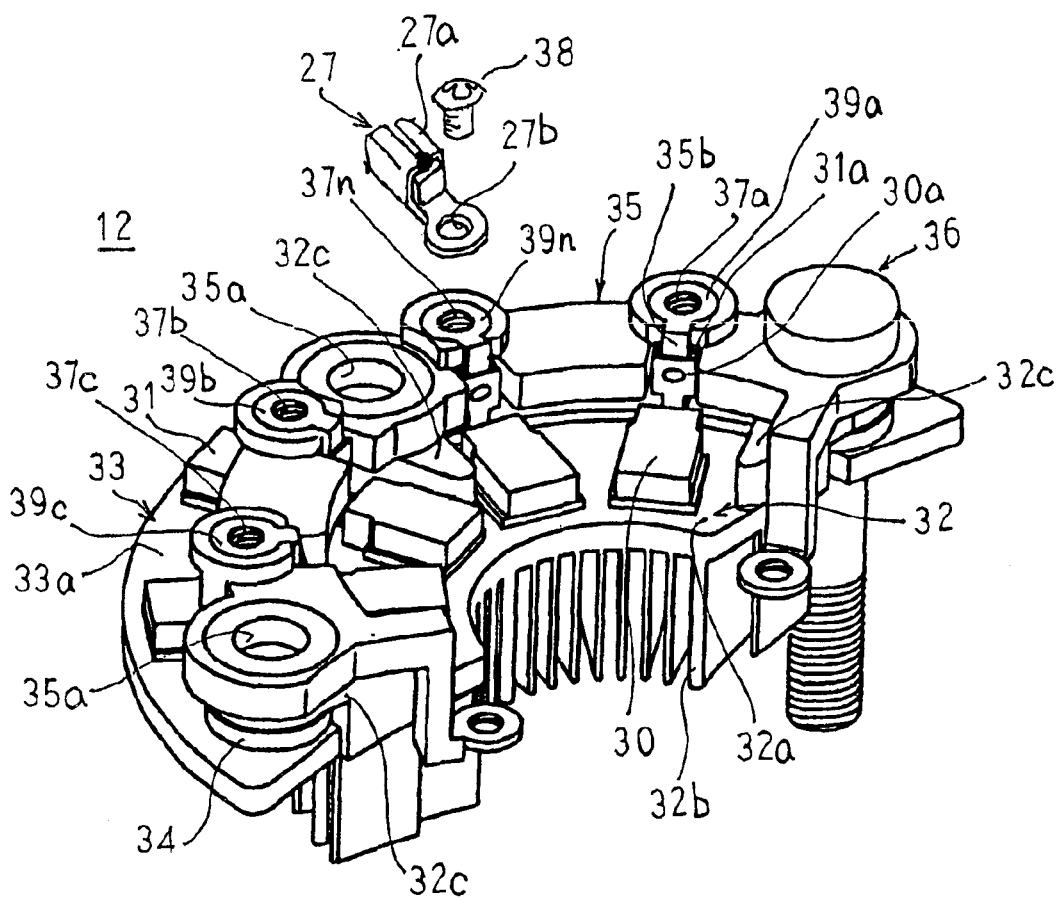
FIG. 16 is a perspective view illustrating a mounting structure for mounting the stator winding of the conventional AC generator for use in a vehicle on a rectifier.

Incidentally, the beginning end portions of the winding units 26 constitute a-phase, b-phase and c-phase lead wires 60a, 60b, and 60c, respectively. The finishing ends of the winding units 26 constitute neutral leads 60n. The stator 8A constituted as described above is mounted on the AC generator for use in a vehicle, as illustrated in FIG. 13, in place of the stator 8.

As illustrated in FIG. 4, in the stator 8A assembled in this way, the lead wire 60a is put above the screw hole 37a. Then, a mounting screw 38 is passed through the cutout 43 of the connection latch portion 42 and then screwed into the screw hole 37a. Thus, the lead wire 60a is electrically connected to the mounting seat 39a. Similarly, the lead wires 60b and 60c are electrically connected to the mounting seats 39b and 39c by screwing the mounting screws 38 into the screw holes 37b and 37c, respectively. Further, three neutral leads 60n are put together and fastened and fixed into the screw hole 37n by using the mounting screw 38, and electrically connected to the mounting seat 39n. Consequently, a three-phase AC stator winding 17A, in which a three phase AC connection (that is, Y-connection) of the neutral leads 60n of the three winding units 60 is established, is obtained. As a result, the output terminal of each of the phases and the neutral points are connected to the rectifier 12.

Thus, according to the first embodiment, the connection latch portion 42 is formed by deforming the each end portion of each of the conductor wires 40 applied to the stator winding 17A. This eliminates the necessity for the metallic terminals 27 that are needed for the connection between the stator winding and the rectifier 12 in the conventional generator. Consequently, the number of components is decreased. Moreover, the need for the operation of connecting the metallic terminals 27 to the wires is eliminated. Thus, the cost is reduced for that.

Incidentally, when the number of slots per pole per phase increases, the number of lead wires and neutral leads increases. Therefore, the larger the number of slots per pole per phase, the effect of reducing the cost according to the present invention becomes more pronounced.

Further, as a result of the fact that the metallic terminals 27 are unnecessary, the defects due to the connection between the metallic terminals 27 and the conductor wires do not occur. Thus, very high reliability is obtained.

First, the strength of the connection from the lead wires 60a, 60b, and 60c and the neutral leads 60n to the rectifier 12 depends only on the securing force of the mounting screws 38 to be screwed into the screw holes 37a, 37b, 37c, and 37n. Thus, stable strength of the connection is obtained.

Further, because the connection latch portion 42 is formed like a plate, the connection latch portion 42 is brought into surface contact with the mounting seats 39a, 39b, 39c, and 39n. The securing force of the mounting screws 38 is uniformly applied to the contact portion between the connection latch portion 42 and each of the seats 39a, 39b, 39c and 39n. Consequently, stable strength of the connection is obtained.

Furthermore, the elimination of the necessity for the solder connection from the metallic terminals to the lead wires and the neutral leads prevents the opening of the connecting portion and the increase in the connection resistance, which are caused owing to the thermal degradation of the solder in the conventional generator. The environmental problem caused by the use of lead solder is eliminated.

Further, the elimination of the need for welding solves the problems of cracks generated in the melted and hardened portions of the conductor wires and the blowholes therein. Furthermore, a high temperature is not applied to the conductor wires 40. Thus, there is no damage to the insulating coating 41 due to the high temperature. Moreover, the corrosion resistance of the conductor wires 40 is enhanced.

Further, according to this first embodiment, the both end portions, from which the insulating coating is removed, of the conductor wire rod are deformed like a plate by press working. Subsequently, the cutout 43 is formed by performing press cutting on each of the both end portions deformed like a plate. Thus, the conductor wires 40 each having the connection latch portion 42 at each of the both end portion thereof are manufactured. Consequently, such conductor wires are manufactured at low cost without needing a special processing method.

Second Embodiment

Figure 5:
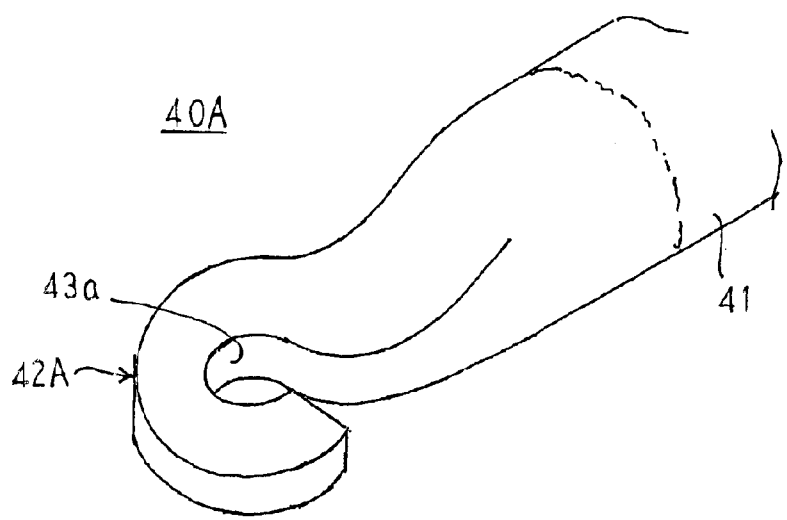
FIG. 5 is a perspective view illustrating a primary part of conductor wires applied to a stator winding of an AC generator, which is a second embodiment of the present invention, for use in a vehicle.

In the case of the second embodiment, as illustrating in FIG. 5, each of conductor wires 40A applied to the stator winding is a copper wire coated with the insulating coating 41 and having a circular cross section. A connection latch portion 42A is formed at each of both end portions of each of the conductor wires 40A. This conductor latch portion 42A has an end portion deformed like a thin plate, whose thickness is less than the diameter of the conductor wire 40A. A cutout 43a serving as a mounting hole, through which the mounting screw 38 is passed, is formed in the end portion deformed like the thin plate. Further, a stator winding is manufactured by using the conductor wires 40A. Incidentally, the rest of the constitution of the second embodiment is similar to the corresponding part of the first embodiment.

Therefore, the second embodiment has effects similar to those of the first embodiment.

Additionally, according to the second embodiment, the connection latch portion 42A is shaped nearly like a letter "C". Thus, when the mounting screw 38 is securely screwed into the screw hole of the rectifier, almost the entire periphery of the connection latch portion 42A is held between the mounting screw 38 and the mounting seat. Consequently, as compared with the first embodiment, larger mounting strength is obtained.

Figure 6:
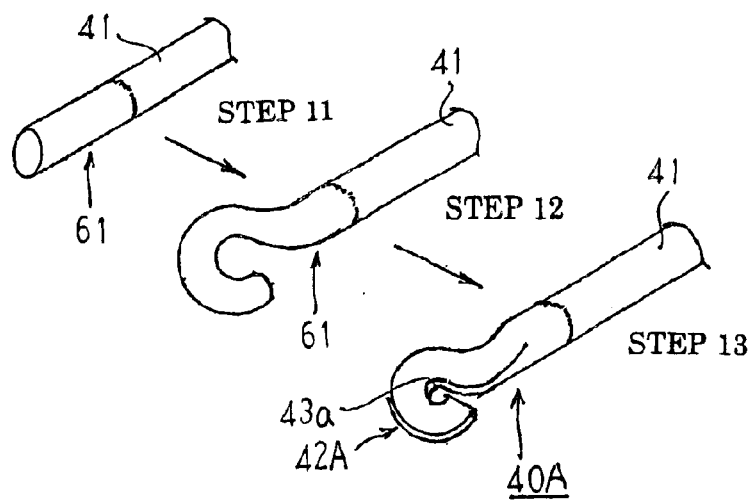
FIG. 6 is a view illustrating a method of manufacturing the connection latch portions of the conductor wires applied to the stator winding of the AC generator, which is the second embodiment of the present invention, for use in a vehicle.

According to the second embodiment, as illustrated in FIG. 6, first, the insulating coating 41 is removed from the both end portions of the conductor wire rod 61 constituted by the copper wire rod having a circular cross section in step 11. Subsequently, each of the both end portions of the conductor wire rod 61 is bent like a ring in step 12. Thereafter, each of the both end portions of the conductor wire 61 is rolled out by press working. Then, each of the both end portions of the conductor wire 61 is deformed like a plate. Next, a cutout 43a is formed therein in step 13.

Thus, in the case of the second embodiment, the conductor wires 40 each having the connection latch portion 42 at each of the both end portions thereof are manufactured at low cost without needing a special processing method.

Third Embodiment

Figure 7:
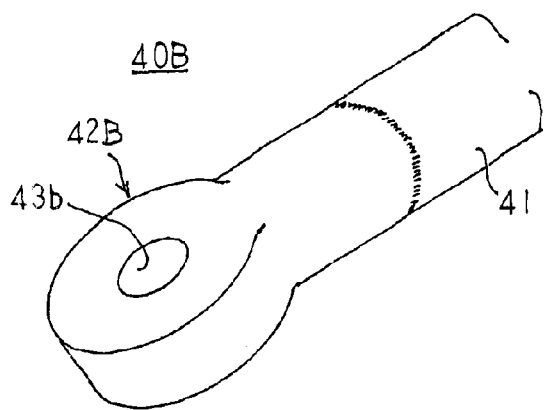
FIG. 7 is a perspective view illustrating a primary part of conductor wires applied to a stator winding of an AC generator, which is a third embodiment of the present invention, for use in a vehicle.

In the case of the third embodiment, as illustrated in FIG. 7, each of conductor wires 40B applied to the stator winding is a copper wire coated with the insulating coating 41 and having a circular cross section. A connection latch portion 42B is formed at each of both end portions of each of the conductor wires 40B. This conductor latch portion 42B has an end portion deformed like a plate. A hole 43b serving as a mounting hole, through which the mounting screw 38 is passed, is formed in the end portion deformed like the plate. Incidentally, the connection latch portion 42B is formed so that the thickness of the connection latch portion 42B is nearly equal to the diameter of the conductor wire 40B. Additionally, the rest of the constitution of the third embodiment is similar to the corresponding part of the first embodiment.

Therefore, the third embodiment has effects similar to those of the first embodiment.

Moreover, because the connection latch portion 42B is formed so that the thickness of the connection latch portion 42B is nearly equal to the diameter of the conductor wire 40B, when the vibrations of the generator are applied to the conductor wires 40B connected to the rectifier 12, bending stresses due to the vibration of the AC generator for use in a vehicle are not concentrated on the root portion of each of the connection latch portions 42B. Consequently, the breaking of the connection latch portions 42B due to the vibrations of the generator is hard to occur. Thus, the reliability is enhanced.

Furthermore, because the connection latch portion 42B is formed so that the thickness of the portion 42B is nearly equal to the diameter of the wire 40B, when a plurality of conductor wires 40B are securely screwed into one screw hole, the conductor wires 40B extending in the vicinity of the connection latch portion 42B do not interfere with one another. Thus, the connectivity is enhanced. For example, when three neutral leads 60n are securely fixed to the single screw hole 37n, only by putting together the three connection latch portions 42B and securing fixing the portions 42B into the screw hole 37n without drawing the three conductor wires 40B therearound in such a way as to prevent an occurrence among the wires 40B.

Figure 8:
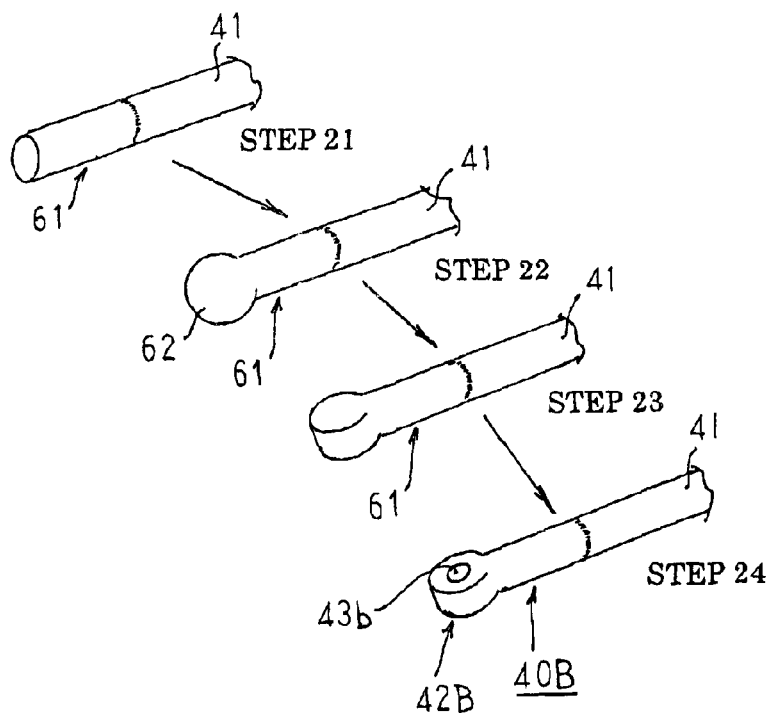
FIG. 8 is a view illustrating a method of manufacturing the connection latch portions of the conductor wires applied to the stator winding of the AC generator, which is the third embodiment of the present invention, for use in a vehicle.

According to the third embodiment, as illustrated in FIG. 8, first, the insulating coating 41 is removed from the both end portions of the conductor wire rod 61 constituted by the copper wire rod having a circular cross section in step 21. Subsequently, each of the both end portions of the conductor wire rod 61 is heated and melted, so that a melted ball 62 of a large diameter is formed in step 22. Moreover, the melted ball 62 formed at each of the both end portions of the conductor wire 61 is rolled out by press working, and then deformed like a plate in step 23. Thereafter, a hole 43b is formed in the end portion deformed like a plate in step 24.

Thus, in the case of the third embodiment, the conductor wires 40B each having the connection latch portion 42B at each of the both end portions thereof are manufactured at low cost without needing a special processing method.

Fourth Embodiment

Figure 9:
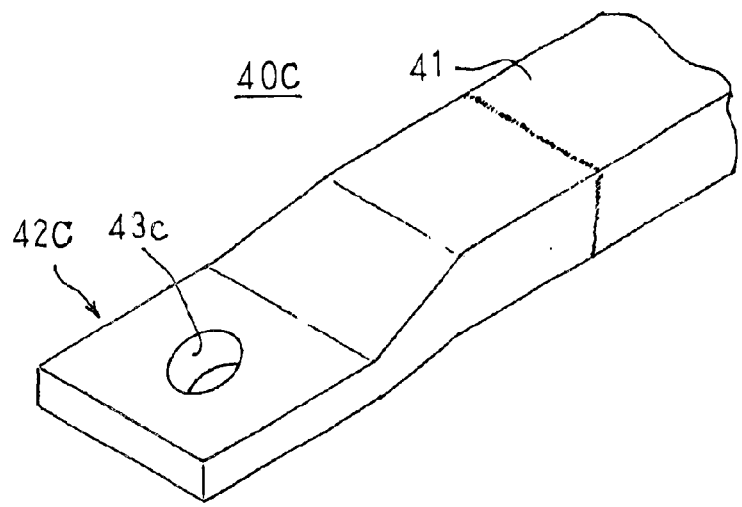
FIG. 9 is a perspective view illustrating a primary part of conductor wires applied to a stator winding of an AC generator, which is a fourth embodiment of the present invention, for use in a vehicle.

In the case of the fourth embodiment, as illustrated in FIG. 9, each of conductor wires 40C applied to the stator winding is a copper wire coated with the insulating coating 41 and having a rectangular cross section. A connection latch portion 42C is formed at each of both end portions of each of the conductor wires 40C. This conductor latch portion 42C has an end portion deformed like a plate obtained by reducing the length of the shorter side of the rectangular cross section. A hole 43c serving as a mounting hole, through which the mounting screw 38 is passed, is formed in the end portion deformed like a plate. Further, a stator winding is produced by using the conductor wires 40C.

Incidentally, the rest of the constitution of the third embodiment is similar to the corresponding part of the first embodiment.

Therefore, the fourth embodiment has effects similar to those of the first embodiment.

Figure 10:
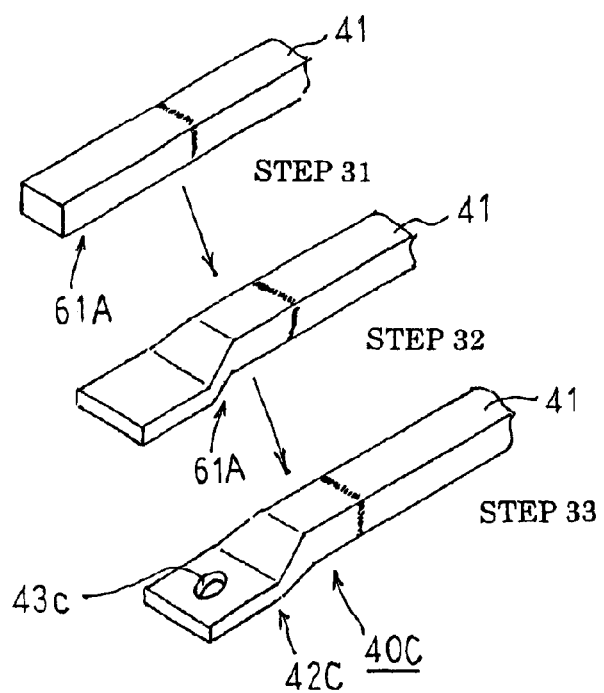
FIG. 10 is a view illustrating a method of manufacturing the connection latch portions of the conductor wires applied to the stator winding of the AC generator, which is the fourth embodiment of the present invention, for use in a vehicle.

According to the fourth embodiment, as illustrated in FIG. 10, first, the insulating coating 41 is removed from each of the both end portions of the conductor wire rod 61A constituted by the copper wire rod having a circular cross section in step 31. Subsequently, each of the both end portions of the conductor wire rod 61A is rolled out by press working, and deformed like a plate in step 32. Thereafter, press cutting is performed on each of the platelike end portions. Thereafter, a hole 43c is formed therein in step 33.

Thus, in the case of the fourth embodiment, the conductor wires 40C each having the connection latch portion 42C at each of the both end portions thereof are manufactured at low cost without needing a special processing method.

Further, each of the connection latch portions 42C is formed by deforming each end portion of the conductor wire 40C like a plate obtained by reducing the length of the shorter side of the rectangular cross section. This facilitates the manufacturing of the plate-like connection latch portion 40C.

Fifth Embodiment

Figure 11:
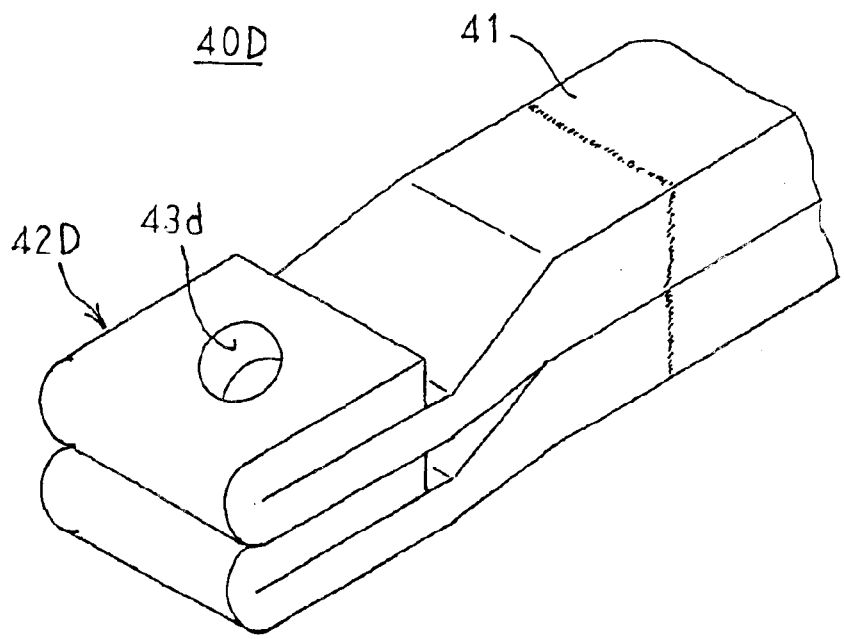
FIG. 11 is a perspective view illustrating a primary part of conductor wires applied to a stator winding of an AC generator, which is a fifth embodiment of the present invention, for use in a vehicle.

In the case of the fifth embodiment, for example, two conductor wires are secured and fixed to a single mounting seat. As illustrated in FIG. 11, each of conductor wires 40D is a copper wire coated with the insulating coating 41 and having a rectangular cross section. A connection latch portion 42D is formed at each of both end portions of the conductor wire 40D. In the case of this connection latch portion 42D, each of the both end portions of the conductor wire 40D is folded back after deformed like a thin (flat) plate so that the thickness of the deformed end portion of the wire 40D is nearly half the thickness of the wire 40D. Moreover, a hole 43d serving as a mounting hole, through which the mounting screw 38 is passed, penetrates through the folded-back portion. Incidentally, the rest of the constitution of the fifth embodiment is similar to the corresponding part of the fourth embodiment.

Therefore, the fifth embodiment does not need the special processing method. Consequently, the fifth embodiment obtains effects similar to those of the fourth embodiment.

Further, in the fifth embodiment, the connection latch portion 42D has a double plate structure wherein the end portion, which is deformed like a thin plate, of the conductor wire 40D is folded back. Thus, the connection latch portion 42D is formed in such a manner as to be thick. Thus, the rigidity of the connection latch portion 42D is increased, so that the connecting reliability thereof is enhanced. Furthermore, the portion 42D can be formed so that the thickness thereof is approximately equal to the thickness of the conductor wire 40D. Thus, when two conductor wires 40D are fastened in the single screw hole, the conductor wires 40D extending in the vicinity of the connection latch portion 42D are prevented from interfering with each other. Consequently, the connectivity thereof is enhanced.

Sixth Embodiment

Figure 12:
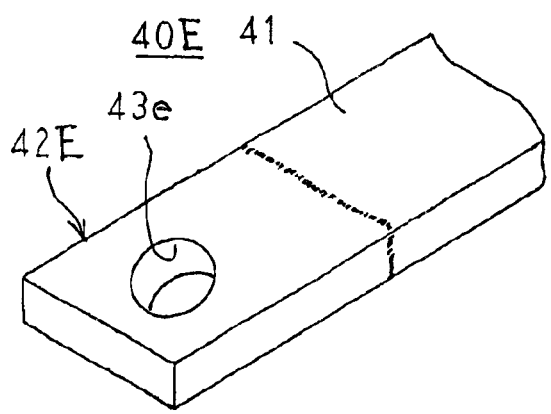
FIG. 12 is a perspective view illustrating a primary part of conductor wires applied to the stator winding of the AC generator, which is a sixth embodiment of the present invention, for use in a vehicle.

In the case of the sixth embodiment, as illustrated in FIG. 12, each of conductor wires 40E is a copper wire coated with the insulating coating 41 and having a flat rectangular cross section. A connection latch portion 42E is formed at each of both end portions, in which a hole 43e serving as a mounting hole is dug, of each of the conductor wires 40E. Incidentally, the rest of the constitution of the sixth embodiment is similar to the corresponding par of the first embodiment.

Therefore, the sixth embodiment has effects similar to those of the first embodiment.

Further, in the case of the sixth embodiment, the connection latch portion 42E is formed at each of the both end portions of each of the conductor wires 40E so that the hole 43e is dug in the end portion thereof. This eliminates the necessity for the press working, which is needed in the first embodiment. Thus, the cost is reduced for that. Moreover, the conductor wires 40E are formed in such a manner as to have a flat shape. Thus, the bendability thereof is good. Moreover, the workability of connecting the conductor wires 40E to the rectifier 12 is enhanced.

Incidentally, although is has been described in the foregoing description of the fifth embodiment that the two conductor wires 40D are fastened and fixed to the single mounting seat, two or more conductor wires may be fastened and fixed to a single mounting seat even in other embodiments. In this case, the steps of pressing and melting to be performed on the end portion of each of the conductor wires may be simultaneously performed on a plurality of those of conductor wires.

Although the preferred embodiments of the present invention have been described above, it should be understood that the present invention is not limited thereto and that other modifications will be apparent to those skilled in the art without departing from the sprint of the invention.

The scope of the present invention, therefore, should be determined solely by the appended claims.

This AC generator of the present invention is constituted as described above. Thus, this AC generator has the following effects.

According to an aspect of the present invention, there is provided an AC generator (hereunder referred to as a first AC generator) for use in a vehicle, which has a stator having a stator core and a stator winding wound around the stator core, and a rectifier for rectifying an AC output of the stator. This AC generator further comprises a connection latch portion formed at an end portion of each of conductor wires constituting the stator winding in such a manner as to have a mounting hole. In this AC generator, the conductor wires are connected to the rectifier by passing mounting screws through the mounting holes to thereby fasten and fix the connection latch portions to mounting seats of the rectifier. Thus, the need for the metallic terminals is eliminated. Moreover, the number of components and the number of man-hours needed for the connecting operation are reduced. Consequently, the present invention provides the AC generator for use in a vehicle, which reduces the cost thereof and enhances the reliability thereof.

Further, in an embodiment (hereunder referred to as a second AC generator) of the first AC generator of the present invention, each of the connection latch portions is formed like a plate. Thus, the area of the contact face between the connection latch portion and the mounting seat increases. Consequently, stable connection strength is obtained.

Further, in an embodiment (hereunder referred to as a third AC generator) of the second AC generator of the present invention, each of the connection latch portions is formed in such a manner as to have a thickness nearly equal to that of the conductor wires. Thus, stresses due to the vibration of the AC generator for use in a vehicle are not concentrated on the root portion of each of the connection latch portions. Consequently, the breaking of the connection latch portions is hard to occur.

Further, in an embodiment (hereunder referred to as a fourth AC generator) of the first AC generator of the present invention, each of the connection latch portions is formed by folding back the end portion of each of the conductor wires deformed like thin plates. Thus, the rigidity of the connection latch portions is increased. Consequently, the reliability of the connection is enhanced.

Further, in an embodiment (hereunder referred to as a fifth AC generator) of the first AC generator of the present invention, each of the conductor wires has a rectangular cross section. Each of the connection latch portions is formed by digging the mounting hole in the end portion of each of the conductor wires. Thus, the necessity for deforming each of the conductor wires like a plate is eliminated. Consequently, the cost is reduced for that.

Further, in an embodiment (hereunder referred to as a sixth AC generator) of the fifth AC generator of the present invention, each of the connection latch portions is formed like a plate whose thickness is less than that of the conductor wires. This facilitates the manufacturing of the plate-like connection latch portion.

Further, according to another aspect of the present invention, there is provided a method for forming connection latch portions of conductor wires applied to a stator winding of an AC generator for use in a vehicle, which comprises the steps of removing an insulating coating from a predetermined end-side range of each of the conductor wires each covered with the insulating coating, deforming an end portion of each of the conductor wires like a plate, and forming a mounting hole in the end portion, which is deformed like a plate, of each of the conductor wires. Thus, the connection latch portions are formed at the end portions of the conductor wires without using a special processing method. Moreover, the connection latch portions are obtained at low cost.

Moreover, according to another aspect of the present invention, there is provided a method for forming connection latch portions of conductor wires applied to a stator winding of an AC generator for use in a vehicle, which comprises the steps of removing an insulating coating from a predetermined end-side range of each of the conductor wires each covered with the insulating coating, bending an end portion of each of the conductor wires like a ring, and deforming the end portion, which is bent like a ring, of each of the conductor wires like a plate and subsequently forming a mounting hole in the end portion of each of the conductor wires. Thus, the connection latch portions are formed at the end portions of the conductor wires without using a special processing method. Furthermore, the connection latch portions are obtained at low cost.

Furthermore, according to another aspect of the present invention, there is provided a method for forming connection latch portions of conductor wires applied to a stator winding of an AC generator for use in a vehicle, which comprises the steps of removing an insulating coating from a predetermined end-side range of each of the conductor wires each covered with the insulating coating, deforming an end portion of each of the conductor wires like a sphere by melting the end portion thereof, deforming the end portion, which is deformed like a sphere, of each of the conductor wires like a plate, and forming a mounting hole in the end portion of each of the conductor wires. Thus, the connection latch portions are formed at the end portions of the conductor wires without using a special processing method. Moreover, the connection latch portions are obtained at low cost.

What is claimed is:

1. An AC generator for use in a vehicle, including:
    a stator having a stator core and a stator winding wound around said stator core; and
    a rectifier for rectifying an AC output of said stator, said AC generator further comprising:
        a connection latch portion formed at an end portion of each of conductor wires constituting said stator winding in such a manner as to have a mounting hole,
        wherein said conductor wires are connected to said rectifier by passing mounting screws through the mounting holes to thereby fasten and fix said connection latch portions to mounting seats of said rectifier.

2. The AC generator for use in a vehicle according to claim 1, wherein each of said connection latch portions is formed like a plate.

3. The AC generator for use in a vehicle according to claim 2, wherein each of said connection latch portions is formed in such a manner as to have a thickness nearly equal to that of said conductor wires.

4. The AC generator for use in a vehicle according to claim 1, wherein each of said connection latch portions is formed by folding back said end portion of each of said conductor wires deformed like thin plates.

5. The AC generator for use in a vehicle according to claim 1, wherein each of said conductor wires has a rectangular cross section, and wherein each of said connection latch portions is formed by digging said mounting hole in said end portion of each of said conductor wires.

6. The AC generator for use in a vehicle according to claim 5, wherein each of said connection latch portions is formed like a plate whose thickness is less than that of said conductor wires.

* * * * *